April 3, 1951     W. B. ELMER ET AL     2,547,309
PNEUMATICALLY ACTUATED OPERATOR FOR
REMOVING RIP COVERS FROM TANKS Filed April 22, 1946     2 Sheets-Sheet 1

INVENTORS
William B. Elmer and
Ralph R. Rimer
BY
Paul E. Friedemann
ATTORNEY

April 3, 1951

W. B. ELMER ET AL 2,547,309

PNEUMATICALLY ACTUATED OPERATOR FOR
REMOVING RIP COVERS FROM TANKS

Filed April 22, 1946

INVENTORS
William B. Elmer and
Ralph R. Rimer.
BY
Paul E. Friedemann
ATTORNEY

Patented Apr. 3, 1951

2,547,309

UNITED STATES PATENT OFFICE 2,547,309

PNEUMATICALLY ACTUATED OPERATOR FOR REMOVING RIP COVERS FROM TANKS

William B. Elmer, Boston, Mass., and Ralph R. Rimer, Sharon, Pa., assignors, by mesne assignments, to the United States of America as represented by the Secretary of the Navy Application April 22, 1946, Serial No. 664,112

2 Claims. (Cl. 121—40)

Our invention relates to naval torpedoes and, more specifically, to an engine for pulling a seal off the port of a torpedo propulsion battery in order to admit sea water which serves as the battery electrolyte.

It is an object of the invention to provide a pulling engine of the type mentioned, which under operation by gaseous pressure is capable of safely and rapidly opening a port seal of relatively high strength, such as a soldered metal seal.

It is also an object to devise such a pulling engine in a manner which offers optimum safety from sea water leaking into the pressure cylinder or other spaces of the torpedo interior and which also prevents the air and other pressure gas from leaking into the torpedo after operating the engine; and it is further aimed at achieving these advantages by means of an engine of simple and inexpensive design of small size and easy mode of assembly.

These objects, as well as the means provided by the invention for achieving them, will be understood from the following description of the embodiment exemplified by the drawing, in which.

Figure 1:
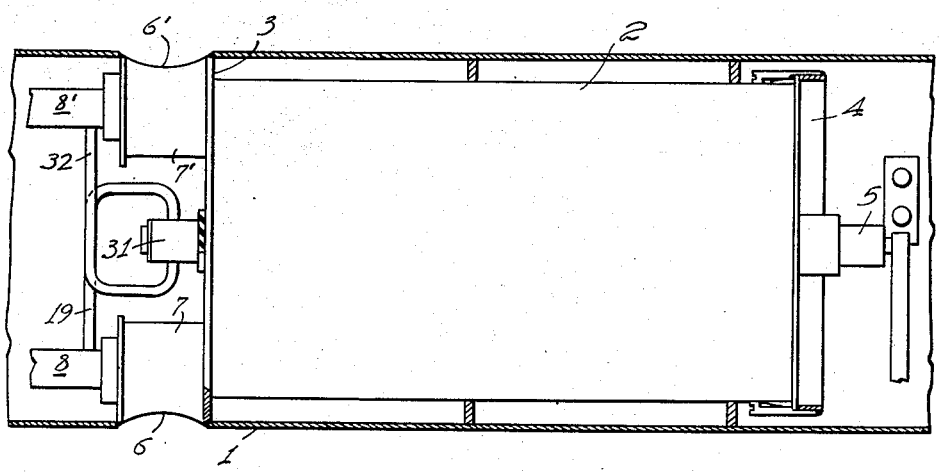
Figure 1 shows a longitudinal sectional view of part of an electric torpedo containing a "casket" for an electric battery.

According to Fig. 1, the interior of the torpedo, whose outer shell is denoted by 1, contains a compartment or casket 2 for the reception of a propulsion battery. The casket is bordered by a bulkhead 3 and tightly sealed by a cover 4 which has a bushing 5 traversed by the electric terminals of the battery.

Figure 2:
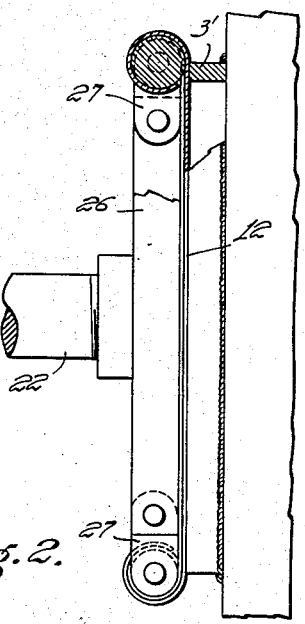
Fig. 2 is a sectional view of one of the port covers appertaining to the battery casket.

The battery is placed in operation by the admission of sea water which enters into the battery cells and between the electrodes to serve as the electrolyte. Immediately upon launching of the torpedo, the sea water enters through openings at 6 and 6' into two port chambers closed by cylindrical shells 7 and 7' respectively. The port chambers communicate with the interior of the battery casket 2 through ports which are opened only after launching of the torpedo, by two respective pulling engines which in Fig. 1 are denoted, as a whole, by 8 and 8', respectively. Details of the pulling engines are apparent from Figs. 2, 3 and 4 in which only one of the pulling engines is shown since the design of the other engine is identical.

Figure 3:
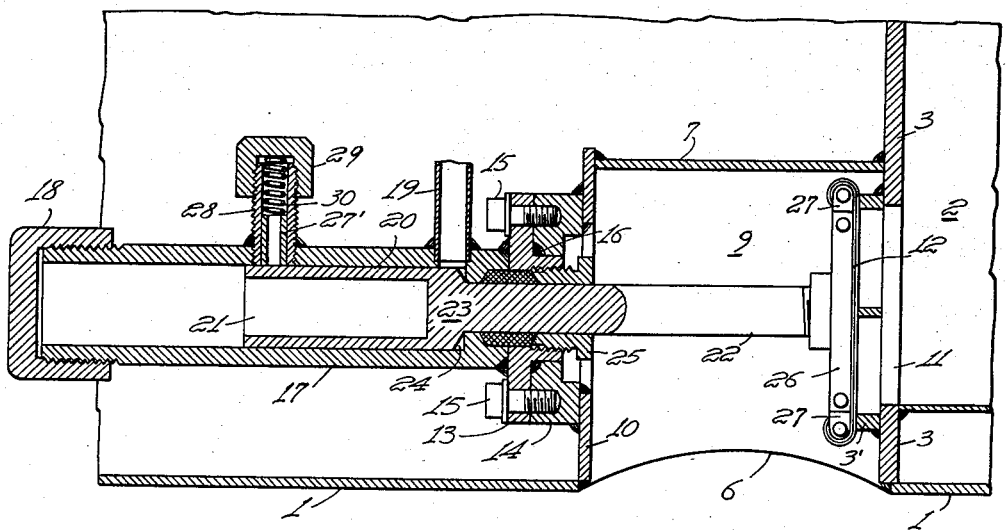
Fig. 3 is a longitudinal sectional view of a pulling engine serving to open the port cover.

According to Fig. 3, the port chamber 9 is closed and sealed against the torpedo interior by means of its cylindrical shell 7 and by a partition 10 welded to the shell 7. The battery casket 2 communicates with the port chamber 9 through a port 11 in bulkhead 3. This port is closed by a cover 12 which consists of a relatively thin metal structure and which is tightly soldered to an annular reenforcement 3' of bulkhead 3. Hence some force is necessary to break the seal and remove the port cover 12 at the proper moment.

The pulling engine to perform the unsealing operation has a flange 13 mounted on a boss 14 by means of screws 15. Boss 14 is welded to the partition 10, and a gasket 16 is provided to obtain a tight seal between flange and boss. The cylinder 17 of the engine is welded to the flange 13 and closed by a cap 18. Gas pressure is supplied to the cylinder through a conduit 19.

The appertaining piston head 20 has a cavity 21 open toward the cap end of the cylinder 17 and extends into a solid stem 22 with which it forms an integral piston structure denoted as a whole by 23. The surface 24 where the stem 22 joins the piston head 20 is sloped to permit the entrance of pressure fluid from the inlet conduit 19. The entire surface of the piston surface is thoroughly oiled to improve the seal between piston and cylinder. The stem 22 is made large enough to resist bending and extends through a packing gland 25 which is screwed into the flange assembly and hence part of the engine structure mounted on the boss 14. The stem 22 extends through the port chamber 9 and is firmly attached to a plate 26 connected by links 27 to the port cover 12.

A pin 27' is slidably mounted in a small tube 28 set in the wall of cylinder 17 and closed by a cap 29 which serves as an abutment for a helical compression spring 30. The location of tube 28 is such that the pin 27' can move out behind the surface 24 and thus lock the piston structure from returning after the completion of the piston stroke. The pin 27' is tubular to admit pressure to the space above so that the cylinder pressure cannot disturb the proper operation of the locking pin.

Figure 4:
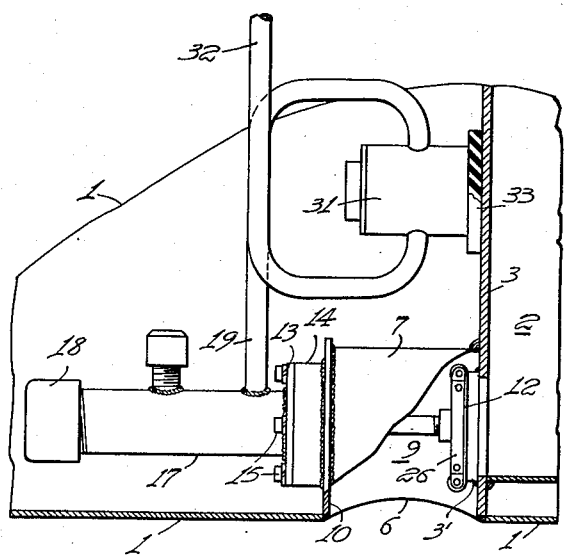
Fig. 4 is a view of the same pulling engine in conjunction with an appertaining pressure control or supply device.

As is apparent from Figs. 1 and 4, the pressure inlet pipe 19 is connected to a fluid pressure supply device 31, which serves also the other pulling engine and hence is provided with another pressure supply tube 32 leading to engine 8'. The device 31 in use supplies fluid under pressure into tubes 19 and 32 after launching of the torpedo. The device 31 may be any suitable apparatus, including a control valve for supplying gas, or any other fluid, under pressure into conduits, or tubes, 19 and 32, or may contain an explosive charge. In the latter case, the device 31, as represented in Fig. 4, is mounted on a rubber cushion 33 or other shock absorbing structure to avoid the transmission of shock to the main torpedo detonator and control equipment. The tubes 19 and 32 leading from the explosion device 31 to the pulling engines are bent in a loop for the same purpose.

When the air valve is opened or the explosive cartridge fired, the piston is forced back through the cylinder, pulling open the port cover and admitting sea water to the battery thus activating the propulsion battery. During the travel of the piston, air is compressed in the cavity 21 within the piston head. The provision of this cavity permits a tight sealing of the cylinder and yet avoids an excessive compression of the air above the piston. In this manner, the engine is assured against the possibility of leakage from the water port, through the packing gland, along the piston and out into the torpedo during the torpedo run. That is, this engine is doubly sealed against leakage of water into the torpedo, and there is no possibility of air or gas leaking from the engine into the torpedo interior proper.

It will be understood that pulling engines embodying the principles of my invention can be modified and altered as to specific design and arrangement without departing from the characteristics and within the scope of the essential features of the invention set forth in the claims annexed hereto.

We claim as our invention:

1. A pulling engine, for opening the cover of a sea water port of an electric torpedo battery, comprising a pressure cylinder, a piston structure having a head portion axially displaceable in said cylinder and a stem portion extending axially out of said cylinder for attachment to the port cover to be opened, said head portion and said cylinder forming together two cylinder spaces at axially opposite sides respectively of said head portion, a conduit attached to said cylinder and communicating with one of said spaces to supply fluid pressure for displacing said piston structure, said cylinder being closed so as to seal said other space, a sealed tubular member mounted on said cylinder and communicating with the interior of said cylinder, a locking pin slidably disposed in said member, and a spring in said member for biasing said pin toward said structure, said pin being tubular to equalize fluid pressure on the cylinder side and spring side of the pin, said structure having a locking surface to permit said pin to enter into locking engagement with said structure after displacement of said structure.

2. A pulling engine, for opening the cover of a sea water port of an electric torpedo battery, comprising a mounting flange structure having a central opening, a cylinder firmly and tightly secured to said flange structure so as to project therefrom substantially axially to said opening, said cylinder being sealed at the end remote from said flange structure and having an axial opening surrounded by an annular radial surface at the end near said flange structure, a piston structure having a head portion slidable within said cylinder and a stem portion integral with said head portion and extending with sliding fit through said cylinder opening for attachment to the cover to be opened, said head portion having a slanted annular surface joining said stem portion so as to form an annular space in said cylinder between said annular surfaces while another cylinder space is formed between said head portion and said sealed cylinder end, a conduit attached to said cylinder so as to communicate with said first space in all positions of said piston structure for supplying fluid pressure to displace said piston structure, a sealed tubular member mounted on said cylinder and communicating with the cylinder interior, a tubular locking pin slidably disposed in said member, a biasing spring within said member for forcing said pin toward said piston structure, said tubular member being located at such a distance from said flange structure that said locking pin projects toward said stem portion for locking engagement with said slanted annular surface when said piston structure has completed its working stroke.

WILLIAM B. ELMER.
RALPH R. RIMER.

REFERENCES CITED

The following references are of record in the file of this patent:

UNITED STATES PATENTS

| Number | Name | Date |
|---|---|---|
| 1,338,676 | Constantinesco et al. | May 4, 1920 |
| 2,172,124 | Gilbert | Sept. 5, 1939 |
| 2,181,562 | De Ganahl et al. | Nov. 28, 1939 |

FOREIGN PATENTS

| Number | Country | Date |
|---|---|---|
| 433,198 | Great Britain | Aug. 12, 1935 |
| 485,617 | Great Britain | May 16, 1938 |